United States Patent [19]
Meisel

[11] 3,877,588

[45] Apr. 15, 1975

[54] APPARATUS FOR LOADING AND UNLOADING A HOT OVEN

[75] Inventor: Nicolas M. Meisel, Epone, France

[73] Assignee: DCA Food Industries Inc., New York, N.Y.

[22] Filed: Nov. 26, 1973

[21] Appl. No.: 418,972

[30] Foreign Application Priority Data
Dec. 4, 1972  France .............................. 72.43117

[52] U.S. Cl. ................. 214/21; 198/193; 198/208; 432/239
[51] Int. Cl. ............................................. F27b 9/38
[58] Field of Search ...... 214/21; 198/184, 193, 208; 432/239, 242

[56] References Cited
UNITED STATES PATENTS
2,818,661  1/1958  Warner ............................ 214/21 X
3,750,904  8/1973  Wisler ................................. 214/21

*Primary Examiner*—Robert G. Sheridan
*Attorney, Agent, or Firm*—Amster & Rothstein

[57] ABSTRACT

This invention relates to method and apparatus for loading and unloading a hot oven and is particularly involved when a requirement exists for closing the oven entrance while part of a conveyor belt supporting the load remains within the oven. The invention also provides for the rapid and easy disassembly of the conveyor belt for cleaning of the oven and the belt. This easy cleaning is useful for food processing and for pharmaceuticals.

6 Claims, 2 Drawing Figures

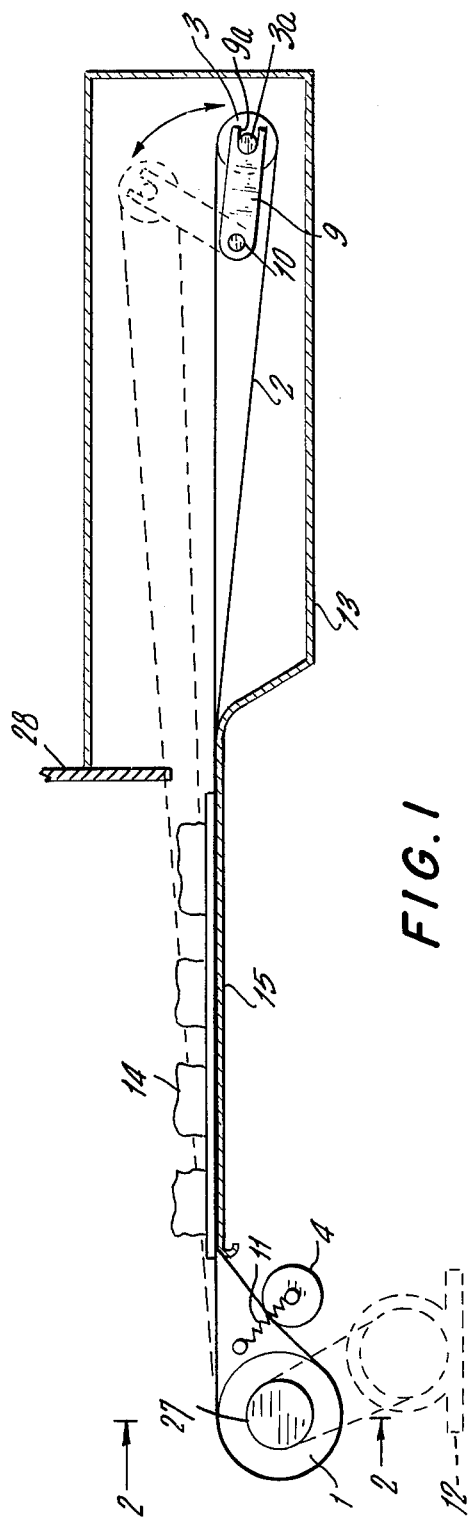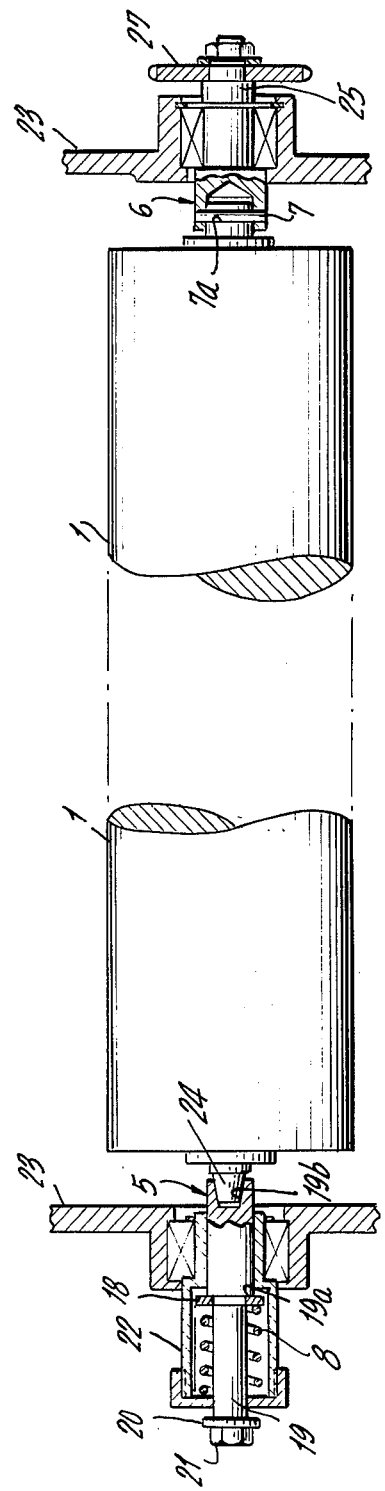

APPARATUS FOR LOADING AND UNLOADING A HOT OVEN

This invention relates to an oven and is particularly concerned with loading and unloading products handled therein.

In the prior art it has been necessary to use scoops or protective gloves in loading and unloading products in a hot oven. This has involved the need for elements separate from the oven that require special manual handling.

In the subject invention the necessity for using scoops and protective gloves is obviated. This is provided by using a continuous belt conveyor mounted on rollers for the loading and unloading. Accordingly, an object of the present invention is to provide such belt and rollers which are easily demounted and removed for cleaning. Another object of the invention is that the upper and lower parts of the continuous belt touch and slide upon each other at the entrance to the oven, thereby permitting the tight closing of the oven door.

In use the products which are to be put in the oven are placed on trays which are then placed on the conveyor belt or placed directly on the part of the belt which is outside the oven. The products are then moved into position in the oven by the belt and the door is closed. At the end of the process time, the door is opened and the products removed from the oven by the belt.

Disassembly of the belt and rollers is also easily accomplished. A slight lifting of the idler roller located in the oven rotates the roller about an off center axis thereby releasing the belt tension. The idler roller is then removed from its mounting by sliding the roller shaft out of its mounting slots. The drive roller at the end of the belt outside the oven is attached at one end to the drive system by a pin and the other end is retained by an axially spring loaded bearing. Removal of the pin and axial movement of the spring loaded bearing releases the drive roller.

The belt and the roller are then free for cleaning as is the oven. Reassembly is easily accomplished by reversing the process.

The invention will be further understood by reference to the following detailed description when taken in conjunction with the accompanying drawings wherein:

FIG. 1 is a schematic side elevation view of the oven loading and unloading system; and FIG. 2 is a fragmentary sectional view of the drive roller.

As shown in the drawings to which reference will now be made in detail and more particularly to FIG. 1, there is shown diagrammatically the loading and unloading conveyor and the oven.

A conveyor belt 2 is mounted on rollers 1 and 3. A support 15 allows the lower part of the belt 2 to be in contact with the upper part of the belt 2 in the vicinity of a vertically closing door 28 of an oven 13 and also supports the belt in the loading and unloading area in front of the oven. Products 14 to be processed in the oven are shown on the belt 2 in the position used for loading and unloading.

The driven roller 1 is driven by a motor 12 shown in dotted lines. Proper belt tension during movement of the belt is maintained by a tensioning roller 4 and tensioning springs 11.

Mounts 9 for the idler roller 3 are attached to pivot shaft 10 in such a manner that they may be manually rotated about the shaft 10. In the ends of the mounts 9 are slots 9a to hold idler shaft 3a of roller 3. A suitable top (not shown) is provided so that when the mounts 9 are rotated in a clockwise position against the stop to the solid line position, the center of roller 3 is below the center line of drive roller 1 and pivot shaft 10. The tension of belt 2 then holds mounts 9 and roller 3 in the operating position. To remove belt 2 and roller 3 from oven 13, mounts 9 and roller 3 are rotated counterclockwise to the upper position shown in dotted lines thus relieving the tension on belt 2. Idler shaft 3a is then lifted from slots 9a in mounts 9 and is free for removal from oven 13.

An embodiment of the belt 1 is a belt of polytetrafluoroethylene which has flexibility, has sufficient tensile strength, has a low coefficient of friction, and will operate at elevated temperatures. An important feature of the belt structure as mentioned hereinbefore is that the two layers of belt 2 contact each other in the vicinity of door 28. This provides an area of thin layers of material on which the door closes so that the vertical closing of the door prevents leakage from within the oven.

Other materials may be used for the belt such as silicon reenforced with glass fibre, stainless steel and others, depending upon the oven temperature and the heat source of the oven.

Considering the drive roller assembly now in greater detail, attention is now directed to FIG. 2. Bearing 5 is mounted in frame 23. A spring and pin housing 22 is mounted in bearing 5. A pin 19 is mounted in housing 22 and is pushed by a spring 8 toward roller 1. Washer 18 is provided adjacent a shoulder 19a of pin 19 because the diameter of spring 8 is greater than the diameter of shoulder 19a. A washer 20 and screw 21 at the end of pin 19 limit the displacement of pin 19 when roller 1 is removed. A conical hole 19b in pin 19 fits a conical end 24 formed as the end of the shaft of roller 1. End 24 of the shaft of roller 1 centers and holds roller 1 in conjunction with the pressure of the spring 8.

A pin 25 holds the other end of roller 1 and is fixed axially by mounting it in bearing 6 which is mounted in frame 23. A pin 7 passes transversely through a slot 7a in pin 25 to prevent the axial movement. Attached to pin 25 is sprocket 27 which is driven by motor 12.

The removal of roller 1 is accomplished by axially displacing pin 19 against the pressure of spring 8 to disengage the adjacent shaft end, disengaging pin 7 from pin 25 and lifting out the roller.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. A belt conveyor system for loading and unloading an oven comprising closing means for said oven;

an endless belt having one section located partly within the oven and another section located outside of the oven and extending away from said closing means;

support means located outside of and adjacent the oven and extending away from said closing means; and said other section of said belt comprising upper and lower parts in contact with each other and said support means and travelling in opposite directions when said belt moves.

2. A system according to claim 1 in which drive and idler rollers are provided at respective ends of said endless belt, and removing means are associated with said rollers to allow said belt to be removed from the oven.

3. A system according to claim 2 in which said removing means includes a conical shaft formed at one end of said drive roller for fitting in a bearing mounting and held in place by a spring, and the other end of said shaft is a cylindrical end having a slot engaged by a transverse pin.

4. A system according to claim 2 in which said idler roller includes a shaft mounted in slots of a mounting that is rotatable about an adjacent center to tighten and loosen said endless belt.

5. A system according to claim 1 in which said endless belt is made of a flexible material having a low coefficient of friction which has a predetermined tensile strength and is adapted to be used at elevated temperatures.

6. A system according to claim 1 in which said closing means is actuable while part of said endless belt remains in the oven.

* * * * *